Oct. 29, 1946.          F. PRIOR              2,410,182
FUEL TANK MOUNTING
Filed Oct. 20, 1944
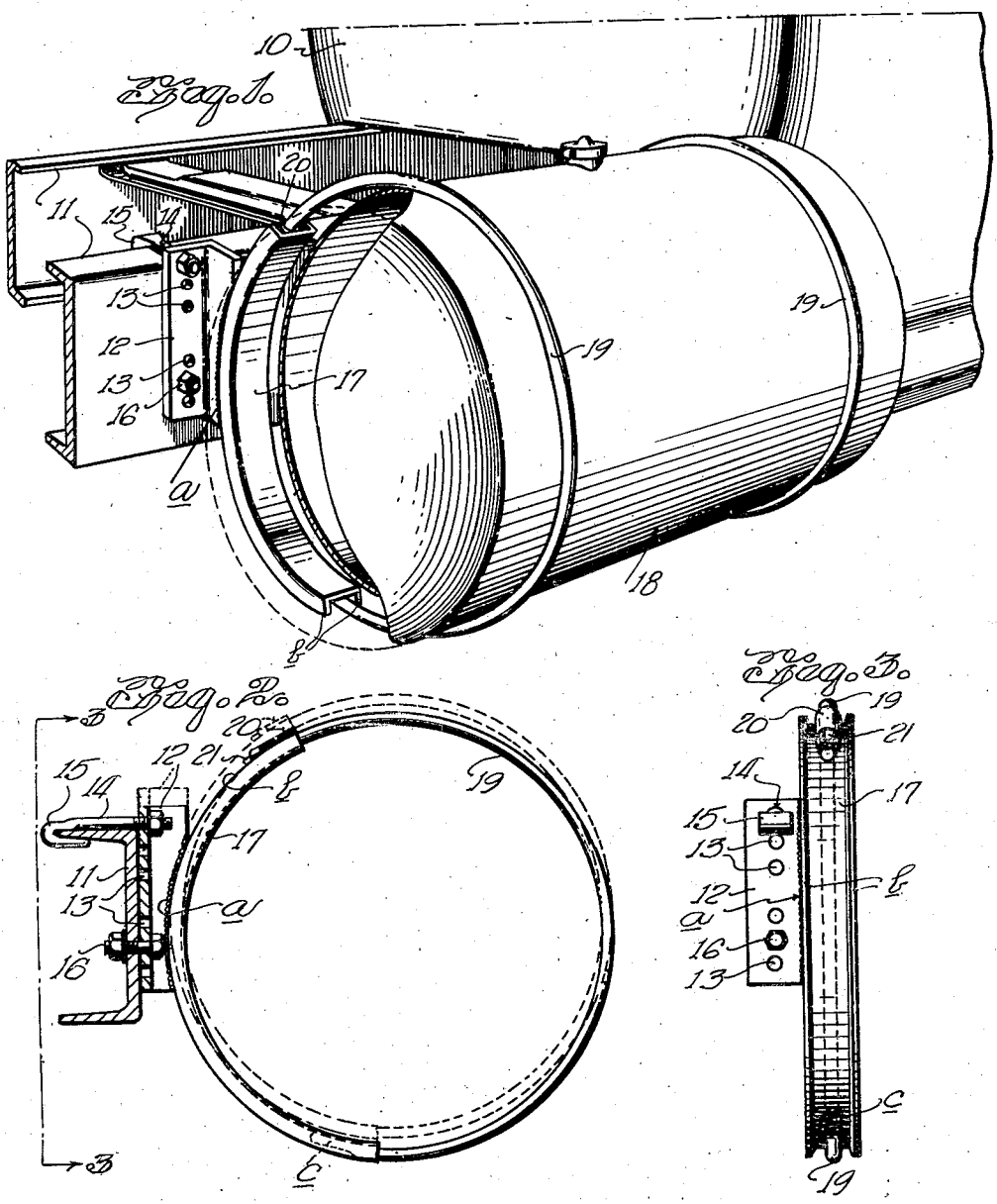
FRED PRIOR
INVENTOR.
BY
ATTORNEY

Patented Oct. 29, 1946

2,410,182

UNITED STATES PATENT OFFICE 2,410,182

FUEL TANK MOUNTING

Fred Prior, Dallas, Tex.

Application October 20, 1944, Serial No. 559,494

2 Claims. (Cl. 280—5)

This invention relates to automotive fuel tanks and it has particular reference to a mounting for reserve fuel tanks for highway trucks, busses and the like.

The principal object of the invention is to provide a tank mounting which is vertically and horizontally adjustable in relation to the frame of the vehicle on which it is supported, which fact makes it possible to insure adequate road clearance, as well as safe spacing between the fuel tank and vehicle frame thereby minimizing fire hazards which present a constant problem in fuel tank mounting. Moreover, by virtue of the feature of adjustability present in the invention the mounting may be moved to displace the tank with respect to the load in the case of highway trucks and tractors, to avoid frictional contact and the hazard created thereby.

Another object of the invention is to provide a fuel tank mounting which is at once easy to install and is of simple and economical construction, yet possesses all prerequisites as to strength and durability.

With the foregoing objects as paramount, the invention has further reference to certain features of accomplishment which will become apparent as the description proceeds, taken in connection with the accompanying drawing wherein:

Figure 1 is a perspective view, fragmentarily showing a truck body with the mounting installed thereon and illustrating a fuel tank partly broken away.

Figure 2 is a side elevational view of the mounting as supported on a vehicle frame channel, the latter being in transverse section, and Figure 3 is a rear view taken on line 3—3 on Figure 2.

Continuing with a more detailed description of the drawing, reference is primarily made to Figure 1 wherein numeral 10 denotes a truck cab and 11, the chassis frame.

Much has been done in the past and efforts are continued to arrange fuel reserve tanks on trucks, tractors, busses and other highway equipment so that they will present the least possible hazard under abnormal conditions. To do so, the tanks, whether of the saddle type or independently supported, must be so disposed in relation to the load or vehicle body that they will always be out of contiguity with any part of the load or frame. Moreover, provision must be made against the possibility that the tank will come in contact with any road obstruction likely to inflict damage to the tank to cause leaks or sparks.

With the foregoing in view, the invention affords a mounting plate in the form of an angle-iron bracket 12, one flange of which is provided with a series of aligned holes 13 and adapted to bear flush against the outer face of the frame 11 of the vehicle. A bolt 14 is passed through the uppermost of the holes 13 and has a hook 15 formed on its inner end which engages over the top flange of the frame member 11, as clearly shown in Figure 2. Extending through another of the holes 13 is a common bolt 16, which passes through an aligned hole in the frame member 11.

It is obvious that there need be but one hole in the frame member 11 to permit of vertical adjustment of the bracket 12 to at least three positions. There is little need for adjusting the tank mounting longitudinally of the frame 11 after the practical location in this respect is first determined.

The outstanding flange of the bracket 12 is arcuately recessed as shown, and to the recessed edge thereof is welded at $a$ an arcuate brace or saddle 17, along one of its flanges $b$.

Embracing the fuel tank 18, of conventional construction, is a circular member 19, preferably a rod, as shown, whose ends are secured to the ends of the brace or saddle 17. One end of the member 19 is thus secured as by welding at $c$ (Figure 3) while the opposite and upper end is passed through a ferrule 20 and, being threaded, receives a nut 21 on the opposite side of the ferrule, which latter is welded or otherwise secured between the flanges $b$ of the brace. In being thus secured, the members 19 may be adjusted in accordance with variations in the diametrical measurements of the tanks 18.

The foregoing description defines one of two tank mounting devices employed for supporting a tank in the manner illustarted in Figure 1, and which are identical except that they are made left and right. Of course, four of such devices are usually made use of to mount tanks on each side of the vehicle frame, generally adjacent the cab 10, as shown.

Manifestly, the construction as shown and described is capable of some modification and such modification as may be construed to fall within the scope and meaning of the appended claims is also considered to be within the spirit and intent of the invention.

What is claimed is:

1. A fuel tank mounting comprising in combination with the channel frame of a vehicle a right angle bracket adapted to be mounted on one side of said vehicle frame, one of its angles having longitudinally aligned bolt receiving apertures to effect adjustable retention thereof vertically on said frame, the other of its angles being arcuately recessed, an arcuate saddle brace secured in a vertical plane along one edge to said arcuate recess at its approximate midsection, a circular tank embracing member having its ends secured to the ends of said saddle brace and means for adjustably holding one end of said member.

2. A fuel tank mounting including a bracket plate secured for vertical adjustment on a vehicle frame, an outwardly extending, arcuately recessed flange on said plate, an arcuate brace secured in said recess in a vertical plane and of substantially U-shape in transverse section, a circular, tank embracing member having its ends secured to said brace and means for adjusting said member circumferentially to adapt the same to tanks of different diameters.

FRED PRIOR.